US011732928B1

(12) United States Patent
Schell

(10) Patent No.: US 11,732,928 B1
(45) Date of Patent: Aug. 22, 2023

(54) GAS RECEIVER FOR CAPTURING SOLAR ENERGY

(71) Applicant: Heliogen Holdings, Inc., Pasadena, CA (US)

(72) Inventor: Steven Schell, Arcadia, CA (US)

(73) Assignee: Heliogen Holdings, Inc., Pasadena, CA (US)

(*) Notice: Subject to any disclaimer, the term of this patent is extended or adjusted under 35 U.S.C. 154(b) by 322 days.

(21) Appl. No.: 17/014,972

(22) Filed: Sep. 8, 2020

Related U.S. Application Data

(60) Provisional application No. 62/897,911, filed on Sep. 9, 2019.

(51) Int. Cl.
| | |
|---|---|
| *F24S 10/25* | (2018.01) |
| *F24S 23/70* | (2018.01) |
| *F24S 80/00* | (2018.01) |
| *F24S 70/16* | (2018.01) |
| *F24S 30/00* | (2018.01) |
| *F24S 70/12* | (2018.01) |

(52) U.S. Cl.
CPC ............ *F24S 10/25* (2018.05); *F24S 23/70* (2018.05); *F24S 30/00* (2018.05); *F24S 70/12* (2018.05); *F24S 70/16* (2018.05); *F24S 2080/07* (2018.05)

(58) Field of Classification Search
None
See application file for complete search history.

(56) References Cited

U.S. PATENT DOCUMENTS

| | | | | | |
|---|---|---|---|---|---|
| 4,121,568 | A | * | 10/1978 | Olsen | F24D 11/003 126/634 |
| 4,161,170 | A | * | 7/1979 | Nicolaisen | F24S 10/502 126/271.1 |

(Continued)

FOREIGN PATENT DOCUMENTS

| | | |
|---|---|---|
| CN | 103500277 A | 1/2014 |
| WO | WO-2012125748 A2 | 9/2012 |
| WO | WO-2017064339 A1 | 4/2017 |

OTHER PUBLICATIONS

Freeman et al. "Closed Loop Control System for a Heliostat Field" 2015 IEEE, 6 Pages.

*Primary Examiner* — David J Laux
(74) *Attorney, Agent, or Firm* — Knobbe, Martens, Olson & Bear LLP

(57) ABSTRACT

A gas receiver configured to heat a working fluid is disclosed. The receiver comprises an aperture, a light absorber, and a pre-heater interposed between the aperture and light absorber. The pre-heater is transparent to visible light and opaque to infrared. The pre-heater in the preferred embodiment comprises quartz in the form of a plurality of quartz plates or quartz tubes, for example, that are oriented substantially parallel to one another. The quartz plates are separated from one another by a gap to permit air to pass into the receiver cavity, while the quartz tubes are hollow to permit air to pass therethrough. The quartz plates or tubes are configured to transmit visible light from the aperture to the light absorber, and to absorb infrared radiation passing from the light absorber toward the aperture. Since the quartz structures absorb infrared, they serve to capture blackbody radiation emitted from the absorber and use that energy to pre-heat air before it passes into the absorber.

20 Claims, 4 Drawing Sheets

(56) References Cited

U.S. PATENT DOCUMENTS

| | | | | |
|---|---|---|---|---|
| 4,232,656 | A * | 11/1980 | Teagan | F24S 60/00 |
| | | | | 126/599 |
| 4,261,337 | A * | 4/1981 | Brosenius | F24S 10/60 |
| | | | | 126/634 |
| 4,300,532 | A * | 11/1981 | Olsen | F24S 10/25 |
| | | | | 126/714 |
| 4,372,292 | A * | 2/1983 | Ort | F24S 80/70 |
| | | | | 126/622 |
| 4,993,235 | A * | 2/1991 | Frantl | F24S 20/63 |
| | | | | 62/235.1 |
| 7,906,750 | B2 | 3/2011 | Hickerson | |
| 9,010,317 | B1 | 4/2015 | Gross | |
| 9,103,719 | B1 | 8/2015 | Ho | |
| 9,482,583 | B1 | 11/2016 | Zavodny | |
| 9,575,480 | B1 | 2/2017 | Azarchs | |
| 9,766,122 | B2 | 9/2017 | Cothuru | |
| 10,359,215 | B2 | 7/2019 | Baker | |
| 2008/0236568 | A1 | 10/2008 | Hickerson | |
| 2009/0229264 | A1 | 9/2009 | Gilon | |
| 2010/0224232 | A1 | 9/2010 | Cummings | |
| 2011/0120448 | A1 | 5/2011 | Fitch | |
| 2012/0174909 | A1 | 7/2012 | Koningstein | |
| 2013/0021471 | A1 | 1/2013 | Waterhouse | |
| 2013/0192668 | A1 * | 8/2013 | Winston | F24S 23/74 |
| | | | | 136/255 |
| 2014/0026885 | A1 * | 1/2014 | Aiso | F24S 10/50 |
| | | | | 126/674 |
| 2014/0083413 | A1 | 3/2014 | Bibi | |
| 2017/0198942 | A1 | 7/2017 | Baker | |
| 2019/0158011 | A1 | 5/2019 | West | |

* cited by examiner

GAS RECEIVER FOR CAPTURING SOLAR ENERGY

CROSS-REFERENCE TO RELATED APPLICATION(S)

This application claims the benefit of U.S. Provisional Patent Application Ser. No. 62/897,911 filed Sep. 9, 2019, titled "Gas receiver for capturing solar energy," which is hereby incorporated by reference herein for all purposes.

TECHNICAL FIELD

The invention generally relates to a solar receiver for capturing solar energy. In particular, the invention relates to a gas receiver configured with quartz elements to selectively transmit visible light and re-absorb infrared radiation.

BACKGROUND

A number of solar power plants rely on a gas receiver to heat a working fluid which is then used to generate steam which turns a generator, for example. These receivers commonly include a partially enclosed cavity in which the sunlight is absorbed and the heat transferred to the working fluid. Many of these receivers however suffer from blackbody radiation losses as a result of infrared radiation escaping from the opening through which sunlight is admitted. The energy losses in these receivers, depending on their size and shape, can severely limit their efficiency. Moreover, the distribution of light within the receiver can result in hot spots that can lead to material failure from excessive temperatures. There is therefore a need for a receiver that can minimize energy losses due to blackbody radiation as well as mitigate the occurrence of hot spots.

SUMMARY

The invention in the preferred embodiment overcomes several disadvantages of the prior art. The invention, for example, produces visible mixing which prevents the sunlight from producing a nonuniform flux pattern on the inner walls of the receiver. Nonuniformities can lead to flow stagnation at hot spots which, in turn, can cause runaway temperatures and absorber failure. In addition, the present invention promotes re-absorption of thermal radiation which, in turn, prevents significant thermal radiation losses when operating at high absorber temperatures.

The invention on one embodiment features a novel gas receiver configured to heat a working fluid. The receiver comprises an aperture; a light absorber; and a pre-heater interposed between the aperture and light absorber. The pre-heater is transparent to visible light and opaque to infrared. The pre-heater in the preferred embodiment comprises quartz in the form of quartz plates or quartz tubes, for example. The quartz plates or tubes are stacked together and oriented substantially parallel to one another. The quartz plates are separated from one another by a gap to permit air to pass into the receiver cavity, while the quartz tubes are hollow to permit air to pass therethrough. The quartz plates or tubes are configured to transmit visible light from the aperture to the light absorber, and to absorb infrared radiation passing from the light absorber toward the aperture. Since the quartz structures absorb infrared, they serve to capture blackbody radiation from the light absorber and pre-heat the air before it passes into the light absorber.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
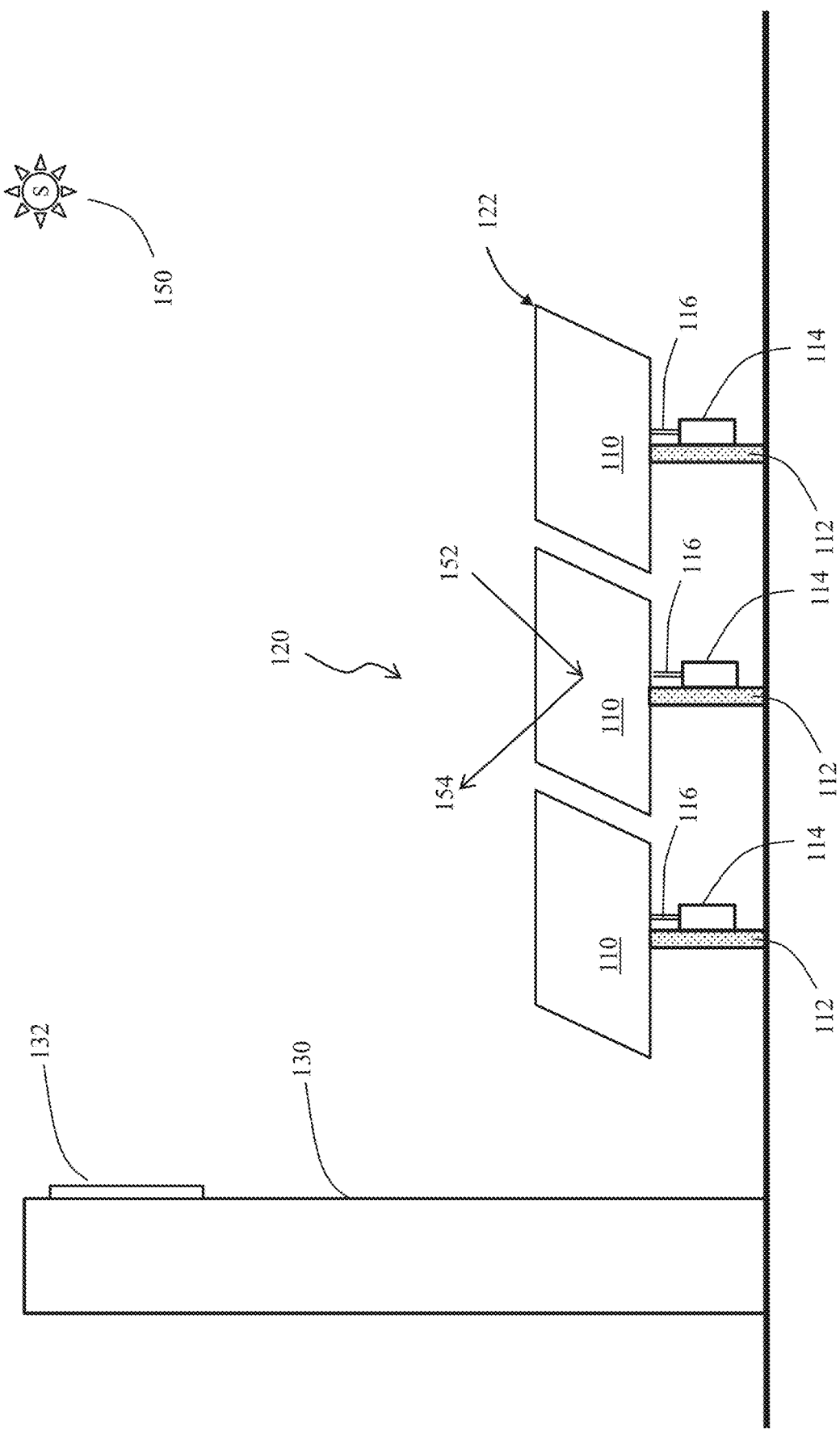
FIG. 1 is an elevation view of heliostat array and gas receiver, in accordance with a preferred embodiment.

The present invention pertains to a gas receiver for capturing solar energy from an array of heliostats that track the sun. Illustrated in FIG. 1 is an elevation view of a heliostat array 120 and gas receiver 130 in accordance with a preferred embodiment. The heliostat array includes numerous identical heliostats 122 that are distributed in two dimensions in proximity to the receiver. Each heliostat 122 includes a mirror 110 pivotably coupled to a frame or stanchion 112 affixed to the ground and/or other heliostats. Each heliostat further includes a tracking controller 114 configured to determine the proper orientation of one or more mirrors through the day. A mirror is properly oriented when the incoming light 152 from the sun 150 is reflected to the gas receiver 130, specifically the receiver aperture 132. If the actual orientation of the mirror differs from the proper orientation at that instant, the tracking controller energizes actuators 116 that drive the mirror to orient the mirror properly.

Figure 2:
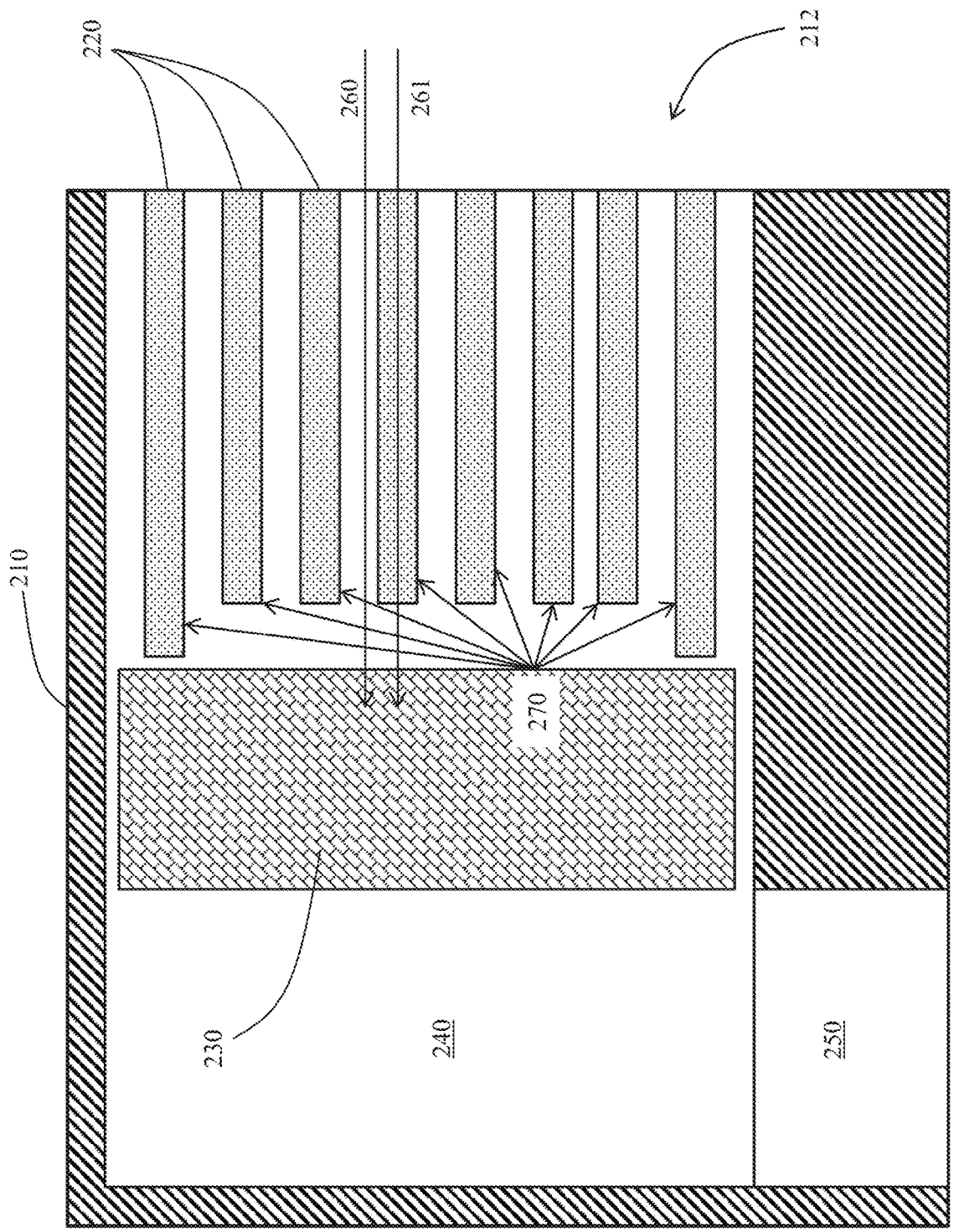
FIG. 2 is a cross section of a gas receiver, in accordance with a first preferred embodiment.

Illustrated in FIG. 2 is a gas receiver for capturing solar energy. The receiver 210 includes the aperture 212 for admitting sunlight reflected by the heliostat array 120. Behind the aperture 212, the receiver 210 includes a plurality of quartz plates 220 (comprising quartz, quartz glass, or fused silica), a wire mesh 230 or other light absorber, and a chamber 240 for receiving air or other working gas. The air or gas is transported from the chamber 240 through duct 250 to a heat exchanger (not shown), turbine (not shown), Stirling engine (not shown) or other device converting heated gas to electricity or for storing the heat, for example.

In the preferred embodiment, the quartz plates 220 are relatively thin (measured in the vertical direction) compared to their width (measured in the horizontal direction). The thickness of the quartz plates can vary from a few millimeters to tens of centimeters. The quartz plates 220 are separated by a gap that can vary from a couple millimeters to a few centimeters. The quartz plates 220 are substantially parallel but may possess small angular variations relative to one another, e.g., less than five degrees of angular variation between plates.

The wire mesh 230 may include a plurality of wire mesh screens or random distribution of wires. The absorber is configured to block light entering the receiver while still permitting air or other working gas to pass through the mesh with little impedance. The wire mesh 230 comprises high temperature materials able to withstand between 800 and 1,500 degrees Celsius.

In operation, rays of sunlight 260, 261 from the array of heliostats 120 are directed to the aperture 212. Some of those rays 260 pass between the quartz plates 210 while other rays 261 pass through the quartz plates which are transparent to visible light. In either case, the sunlight 260, 261 passes into the wire mesh 230 where it is absorbed, effectively heating the wire mesh. Concurrently, air or other gas is drawn into the aperture 212, between the quartz plates 220, through the wire mesh 230, into the chamber 240, and down the conduit 250. The heated air is then used to generate electricity, drive a chemical reaction, or stored for later use, The wire mesh 230, which is heated to above 800 degrees Celsius, produces black body radiation throughout the wire mesh. The black body radiation includes infrared radiation emanating from point 270, for example. In the present, infrared radiation is radiated back into the quartz plates 220 where it is reabsorbed by the quartz plates which are opaque to infrared radiation. The infrared radiation, in turn, heats the quartz plates 220. Since the air is drawn across the plates 220, the plates effectively pre-heat the air before reaching the wire mesh 230, thus recapturing the radiative losses that occur in other receivers. Some infrared radiation may escape between the quartz plates 220, but the losses are minimized by maintaining a small gap between plates 220. Costs are also reduced since the quartz plates 220 are inexpensive to manufacture and require no precision machining.

In the preferred embodiment, the quartz plates 220 are configured to achieve a maximum operating temperature of 600 degrees. The wire mesh 230 operates between 900 to 1500 degrees. The working gas is generally air or steam (with the addition of a quartz window at the aperture to seal the receiver).

Figure 3:
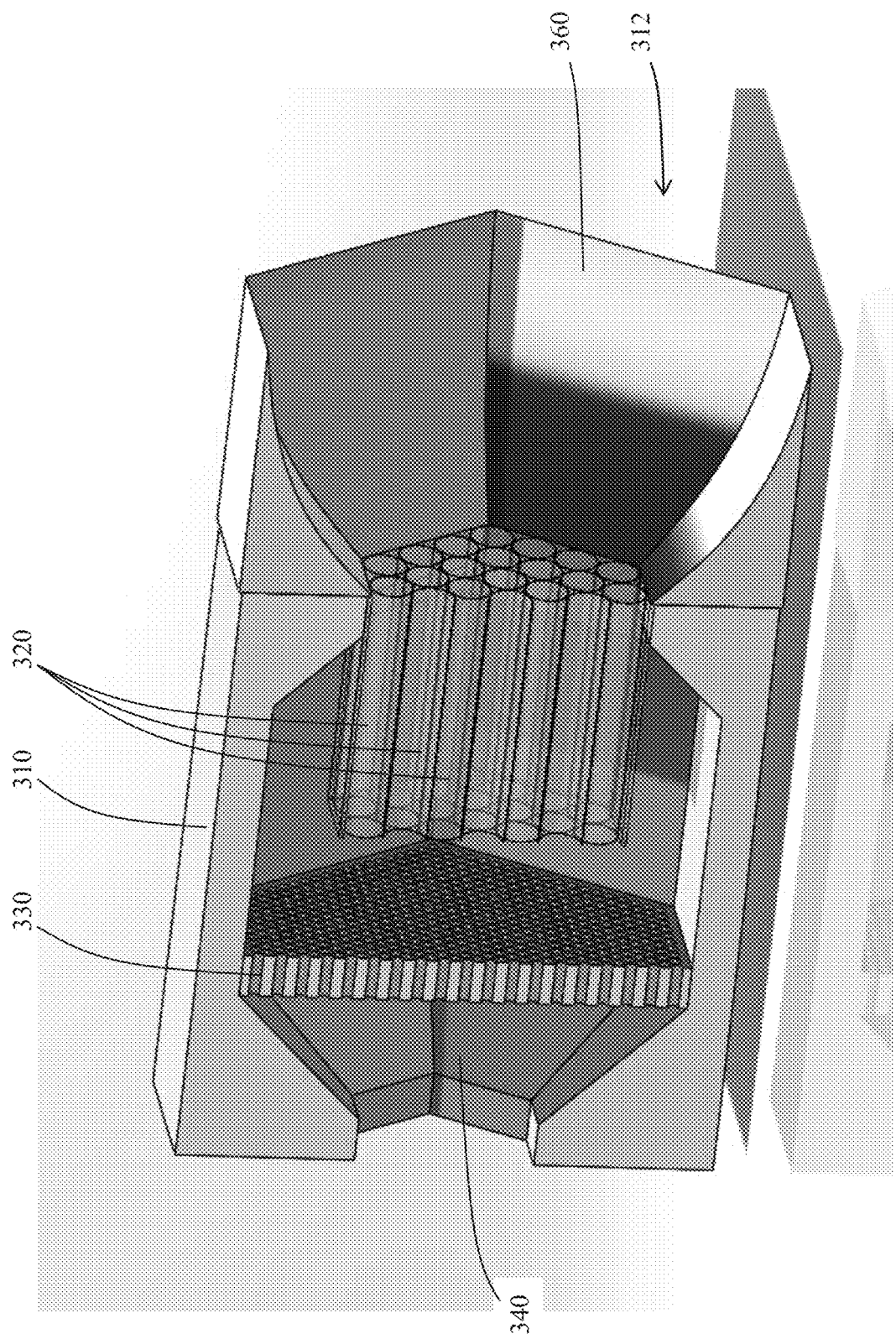
FIG. 3 is a cross section of a gas receiver, in accordance with a second preferred embodiment.

Illustrated in FIG. 3 is another gas receiver in accordance with a second embodiment of the present invention. The receiver 310 includes the aperture 312 for admitting sunlight reflected by the heliostat array 120 as well as a secondary reflector 360 for funneling light into the receiver. Behind the secondary reflector 360, the receiver 310 includes a plurality of quartz tubes 320 (comprising quartz, quartz glass, or fused silica), a light absorber 330, and a chamber 340 for receiving air or other working gas. The air or gas is transported from the chamber 330 through duct to a heat exchanger (not shown), turbine (not shown), Stirling engine (not shown) or other device for storing the heat or converting heated gas to electricity, for example.

In the second preferred embodiment, the quartz tubes 320 are employed instead of quartz plates. The quartz tubes, which are relatively long compared to their diameter, are stacked in a honeycomb pattern with their longitudinal axes aligned in parallel from the aperture 312 to the absorber 330. In this embodiment, the quartz tubes 320 can abut one another or be separated by a gap that varies between a couple millimeters and a few centimeters. The quartz tubes 320 are substantially parallel to one another hut may, possess small angular variations relative to one another, e.g., less than five degrees of angular variation between plates.

The quartz tubes 320 are hollow, thus allowing air to pass from the aperture 312 to the absorber 330. The wall thickness of the quartz tubes 320 can vary from about one millimeter to less than a centimeter. The tube diameter can vary from several millimeter to several centimeters, and the length can vary from approximately three times the diameter to several tens of times the diameter.

In operation, rays of sunlight from the array of heliostats 120 are directed to the aperture 312. Some of those rays pass through the hollow quartz tubes 320 without impinging on the tubes while other rays pass through the quartz tribes. In either case, the sunlight propagates from the region of the quartz tubes 320 to the absorber 330 where it effectively heats the absorber. Concurrently, air or other gas is drawn into the aperture 312, through the hollow quartz tubes 330, through the absorber 330 where it is heated, and drawn into the chamber 340. Heated air is then used to generate electricity, drive a chemical reaction, or stored for later use.

In the preferred embodiment, the light absorber 330 comprises corrugated foil comprising made of refractory metal alloy such as KANTHAL (TM) comprising FeCrAl, in other embodiments, the light absorber comprises layers of refractory wire mesh, refractory metal alloy, corrugated foils, ceramic foam such as Silicon Carbide, or structured ceramic monoliths such as honeycomb structures.

Figure 4:
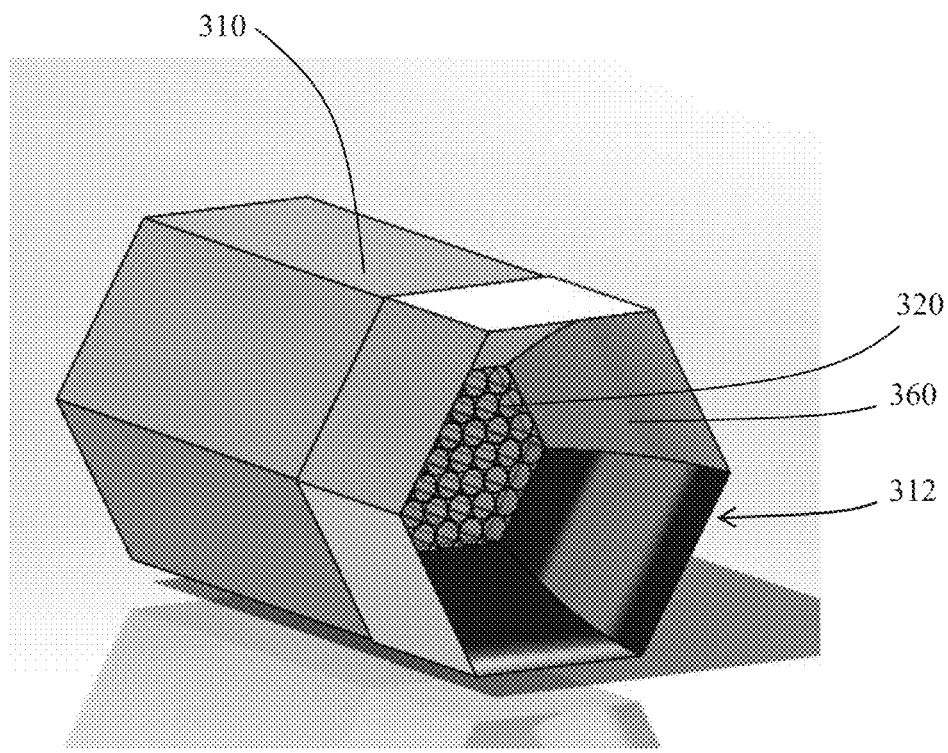
FIG. 4 is a perspective view a gas receiver, in accordance with the second preferred embodiment.
Figure 5:
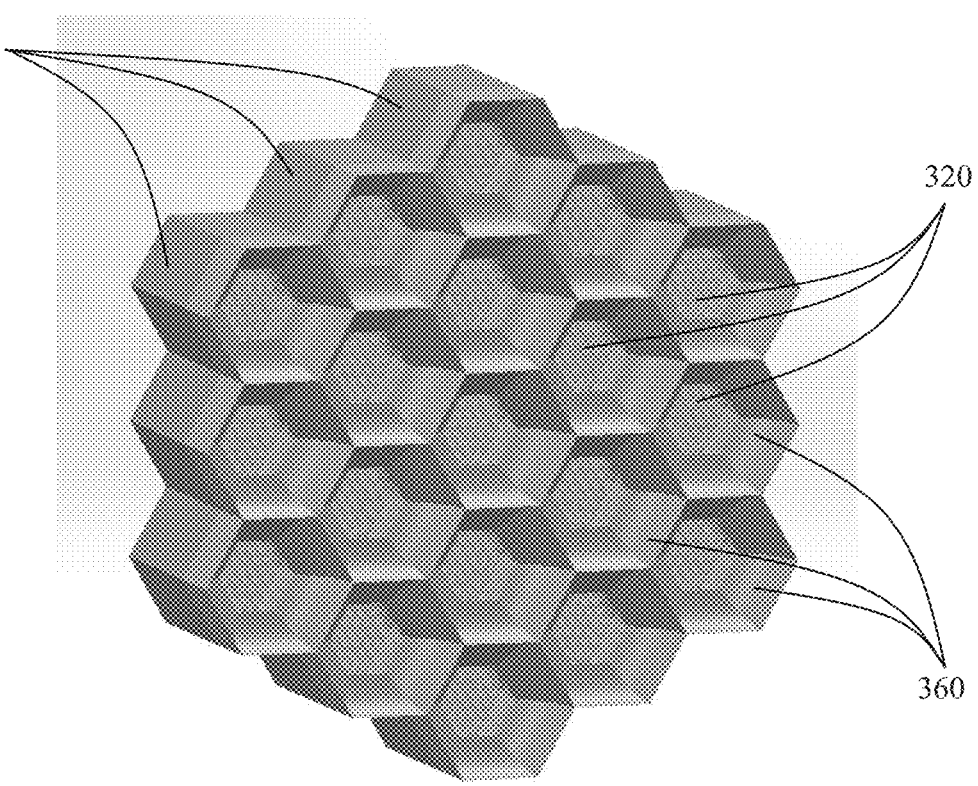
FIG. 5 is a perspective view of an array of gas receivers, in accordance with a third preferred embodiment.

Illustrated in FIG. 4 is a perspective view a gas receiver in accordance with the second preferred embodiment. As shown, the gas receiver 310 has the shape of a hexagonal tube. The longitudinal axis of the tube runs lengthwise from the aperture 312 to an output port where the heated gas is discharged. The hexagonal form factor enables an array of receivers 310 to be compactly stacked in a honeycomb pattern, as shown in perspective view in FIG. 5.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer, processor, electronic circuit, or module capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including electronic circuits such as personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A gas receiver configured to heat a working fluid, the receiver comprising:

an aperture configured to allow sunlight and a working fluid to pass therethrough;

a light absorber: and a pre-heater interposed between the aperture and light absorber;

wherein the pre-heater is transparent to visible light and opaque to infrared.

2. The gas receiver of claim 1, wherein the pre-heater comprises quartz.

3. The gas receiver of claim 2, wherein the pre-heater comprises a plurality of quartz plates configured to absorb infrared radiation.

4. The gas receiver of claim 3, wherein the plurality of quartz plates are oriented substantially parallel to one another and relative to the aperture so that at least some rays of sunlight pass between the plates.

5. The gas receiver of claim 4, wherein all the plurality of quartz plates are separated from one another by a gap.

6. The gas receiver of claim 5, wherein the gap between the plurality of quartz plates is sized to permit the working fluid to pass from the aperture, through the pre-heater, and to the light absorber.

7. The gas receiver of claim 5, wherein the quartz plates are configured to:

transmit visible light from the aperture to the light absorber; and absorb infrared radiation passing from the light absorber toward the aperture.

8. The gas receiver of claim 1, wherein the light absorber comprises FeCrAl foil.

9. The gas receiver of claim 1, wherein the light absorber comprises wire mesh.

10. The gas receiver of claim 1, wherein the light absorber comprises a ceramic foam.

11. The gas receiver of claim 1, wherein the working fluid is air.

12. A gas receiver configured to heat a working fluid, the receiver comprising:

an aperture configured to allow sunlight and a working fluid to pass therethrough;

a light absorber; and a pre-heater interposed between the aperture and light absorber comprising a plurality of plates oriented substantially parallel to one another and transverse to a plane of the aperture, the plurality of plates being configured to absorb infrared radiation, wherein the pre-heater is transparent to visible light and opaque to infrared.

13. The gas receiver of claim 12, wherein the plurality of plates comprise quartz.

14. The gas receiver of claim 12, wherein the plurality of plates are separated from one another by a gap.

15. The gas receiver of claim 14, wherein the gap between the plurality of plates is sized to permit air to pass from the aperture, through the pre-heater, and to the light absorber.

16. The gas receiver of claim 12, wherein the plurality of plates are configured to:

transmit visible light from the aperture to the light absorber; and absorb infrared radiation passing from the light absorber toward the aperture.

17. The gas receiver of claim 12, wherein the light absorber comprises FeCrAl foil.

18. The gas receiver of claim 12, wherein the light absorber comprises wire mesh.

19. The gas receiver of claim 12, wherein the light absorber comprises a ceramic foam.

20. The gas receiver of claim 12, wherein the working fluid is air.

\* \* \* \* \*

UNITED STATES PATENT AND TRADEMARK OFFICE
CERTIFICATE OF CORRECTION

PATENT NO. : 11,732,928 B1
APPLICATION NO. : 17/014972
DATED : August 22, 2023
INVENTOR(S) : Steven Schell It is certified that error appears in the above-identified patent and that said Letters Patent is hereby corrected as shown below:

In the Specification

On Column 3, Line 9: Delete "use," and insert -- use. --.

On Column 3, Line 52: Delete "hut may," and insert -- but may --.

On Column 4, Line 8: Delete "FeCrAl, in" and insert -- FeCrAl. In --.

Signed and Sealed this
Seventeenth Day of October, 2023

Katherine Kelly Vidal
*Director of the United States Patent and Trademark Office*